United States Patent [19]

Kageyama et al.

[11] Patent Number: 5,159,384
[45] Date of Patent: Oct. 27, 1992

[54] CAMERA EXPOSURE CONTROL SYSTEM SELECTIVELY OPERATIVE IN EXPOSURE CONTROL MODE BASED ON MULTI-SPOT LIGHT MEASUREMENT OR IN EXPOSURE CONTROL MODE BASED ON FLASH LIGHT

[75] Inventors: Naohiro Kageyama, Sakai; Masayasu Hirano, Nishinomiya, both of Japan

[73] Assignee: Minolta Camera Kabushiki Kaisha, Osaka, Japan

[21] Appl. No.: 609,379

[22] Filed: Nov. 5, 1990

[30] Foreign Application Priority Data

| Nov. 7, 1989 | [JP] | Japan | 1-287883 |
| Nov. 7, 1989 | [JP] | Japan | 1-287884 |
| Nov. 7, 1989 | [JP] | Japan | 1-287885 |
| Nov. 7, 1989 | [JP] | Japan | 1-287886 |

[51] Int. Cl.⁵ .................................................. G03B 15/03
[52] U.S. Cl. .................................................. 354/413
[58] Field of Search ............ 354/413, 415, 418, 419, 354/410, 126, 145.1, 429, 431, 432, 433, 434, 127.1, 127.11, 127.12, 416, 417, 420, 421, 422

[56] References Cited

U.S. PATENT DOCUMENTS

| 3,836,922 | 9/1974 | Hasegawa et al. | 354/421 X |
| 4,047,187 | 9/1977 | Mashimo et al. | 354/432 X |
| 4,500,191 | 2/1985 | Yamanaka | 354/418 |
| 4,534,639 | 8/1985 | Konishi et al. | 354/432 |
| 4,618,238 | 10/1986 | Maitani et al. | 354/431 |
| 4,746,949 | 5/1988 | Takei et al. | 354/429 |
| 4,779,117 | 10/1988 | Fujino et al. | 354/434 |
| 4,816,853 | 3/1989 | Kikukawa et al. | 354/412 |
| 4,821,074 | 4/1989 | Nakai et al. | 354/429 X |

Primary Examiner—W. B. Perkey
Attorney, Agent, or Firm—Willian Brinks Olds Hofer Gilson & Lione

[57] ABSTRACT

A camera exposure control system based on multi-spot light measurement is designed to determine the exposure value from measured values provided by measuring the brightness of arbitrary portions of the photographic view field a plurality of number of times. With exposure control mode based on multi-spot light measurement being selected by the photographer, exposure control is implemented based on the exposure value resulting from multi-spot light measurement, and the operation of the flash device is disabled automatically. With flash light photography mode being selected by the photographer, exposure control based on multi-spot light measurement is disabled, and exposure control based on averaged light measurement or exposure control for flash light photography is implemented. In the case of program exposure control based on the exposure value resulting from multi-spot light measurement, the exposure control value is determined by restoring the reference program line at each implementation of the program exposure control based on a new exposure value, even if the program line has been altered.

9 Claims, 9 Drawing Sheets

(a)

(b)

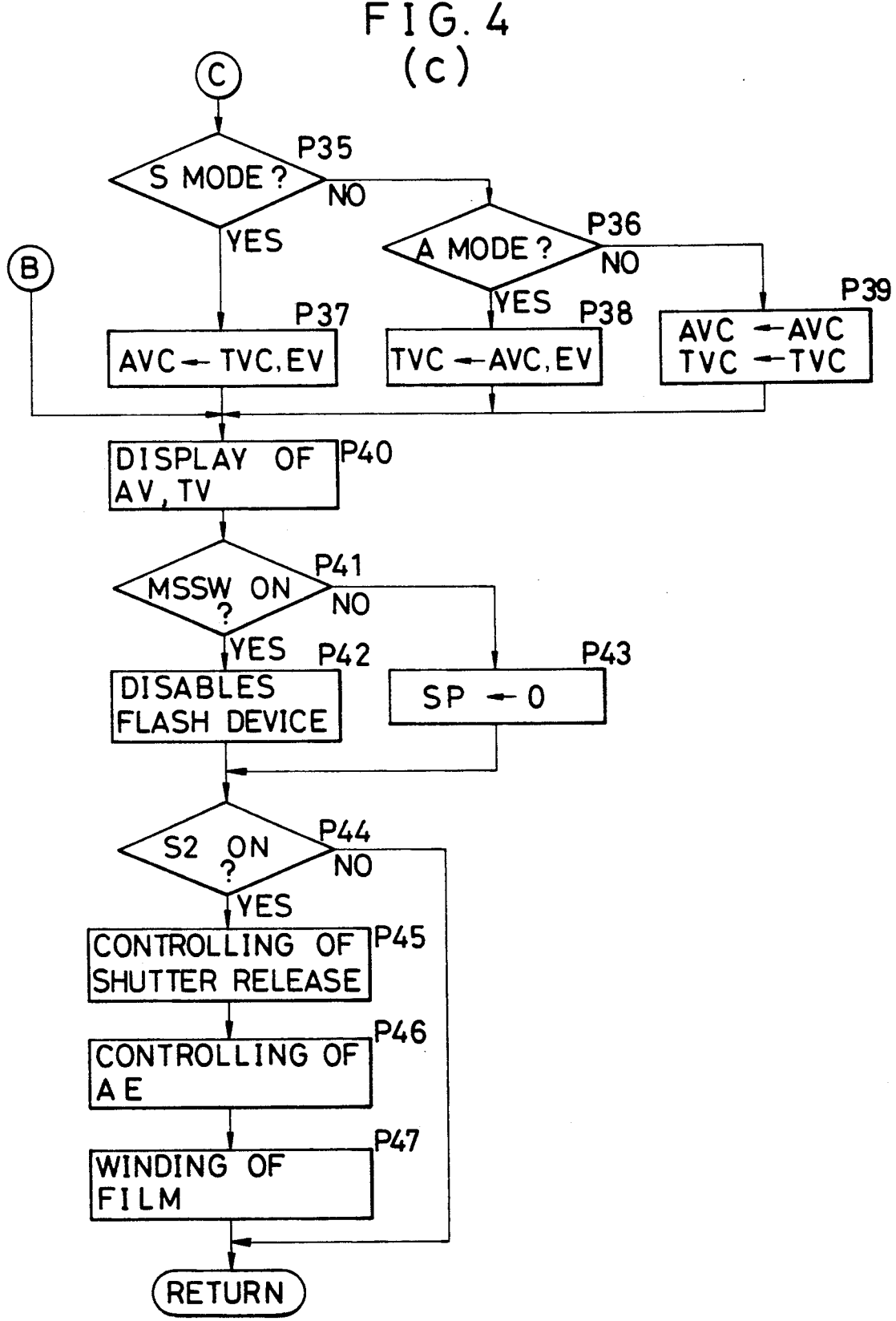

(b)

CAMERA EXPOSURE CONTROL SYSTEM SELECTIVELY OPERATIVE IN EXPOSURE CONTROL MODE BASED ON MULTI-SPOT LIGHT MEASUREMENT OR IN EXPOSURE CONTROL MODE BASED ON FLASH LIGHT

BACKGROUND OF THE INVENTION

1. Field of the Invention

The present invention relates to a camera exposure control system, and particularly to a camera exposure control system which measures the brightness of arbitrary portions of the photographic view field a plurality of number of times and determines the exposure value based on the measured values.

2. Description of the Prior Art

There have been known automatic exposure control systems of cameras which select a plurality of portions in the photographic view field, such as the principal object, background section, etc., which are considered to be crucial for the exposure control, measure the brightness of these portions, calculate a value (e.g., mean value) from the measured light values, and implement the exposure control based on the calculated value. Among such automatic exposure control systems. some are designed to switch the normal photography mode based on the multi-spot light values to the flash photography mode when a slower shutter speed (longer shutter opening time) is expected due to a darker photographic object or the like.

In the above-mentioned automatic exposure control system, once control is switched to the flash photography mode, the exposure control specific to flash light photography takes the place of the exposure control based on multi-spot light values. Namely, in a flash-matic control system, a value of aperture stop is determined from given values of the guide number indicative of the light output of the flash lamp and the sensitivity of the film and from the distance to the object, but without using measured light values of the photographic object. In an automatic flash light adjustment control system, a flash lamp is activated with the aperture stop being set arbitrarily, and is disactivated the flash lamp when the intensity of reflected light from the object has reached the proper exposure value, and it does not use measured light values of the object.

Accordingly, in order for the automatic exposure control system to use the function of exposure control based on the multi-spot light measurement effectively, it needs to disable the flash photography mode. However, no camera has such operating mode, and therefore the multi-spot light measurement to have a proper exposure is carried out in vain due to automatic switching to the flash photography mode. Some flash device attached externally to a camera is not designed to receive a flash inhibit signal from the camera, and also in this case the multi-spot light measurement to have a proper exposure is carried out in vain due to automatic switching to the flash photography mode.

There has been also known an exposure control system having a program mode for determining the exposure control values to be set on the camera, i.e., values of aperture stop and shutter speed, in which combinations of aperture stop values and shutter speeds are determined in advance for exposure values which are determined from light values of objects and film sensitivities, and a set of aperture stop and shutter speed is selected based on the determination of the exposure value in response to the measured light value and the film sensitivity signal. Also known are program shift means which, if the determined aperture stop and shutter speed are not desirable, alter the aperture stop or shutter speed to the intended value while retaining the exposure value. Some is designed to memorize the shift value so that it implements the program shift automatically by that shift value in the later photographic operation.

The exposure control system of this type is designed such that when the brightness of arbitrary portions of the photographic view field is measured with a multi-spot light measuring device, a newly measured light value at each reading is rendered a computation with older values which have already been read and the mean value, for example, of the measured light values is produced as the brightness of the photographic view field to be used for the exposure control. The exposure control in the program mode results in the variation of the exposure value and accordingly in the variation of the aperture stop and shutter speed at each reading of the light value.

On this account, once the photographer has used the program shift and thereafter the measured light value is read, a proper exposure is not achieved by the values of aperture stop and shutter speed based on the program shift. It requires another setting of the aperture stop and shutter speed based on a new exposure value, but the conventional exposure control system does not cope with this situation.

SUMMARY OF THE INVENTION

An object of the present invention is to provide an improved camera exposure control system which is operative selectively in the exposure control mode based on the multi-spot light measurement for measuring arbitrary portions of the photographic view field a plurality of number of times or the exposure control mode based on the flash light.

Another object of the present invention is to provide a camera exposure control system which operates to disactivate automatically the flash device when the multi-spot light measurement control mode, in which the brightness of arbitrary portions of the photographic view field is measured a plurality of number of times, is selected.

A further object of the present invention is to provide a camera exposure control system which disables the exposure control based on the multi-spot light measuring exposure control mode when the flash light photography mode is selected.

A further object of the present invention is to provide a camera exposure control system which, in determining the exposure control value based on the multi-spot light measurement in the program exposure control mode in which the exposure control value is determined in accordance with the predetermined program line, operates to determine a new exposure control value by restoring the program line, but without changing the exposure value, even after the program line has been altered (program shift) for changing the combination of the aperture stop and shutter speed.

Other objects of the present invention will become apparent from the following detailed description taken in conjunction with the accompanying drawings.

BRIEF DESCRIPTION OF THE DRAWINGS

FIGS. 4(a) through 4(c) are flowcharts showing the exposure control process with the light measuring switch being set ON;

DETAILED DESCRIPTION OF THE PREFERRED EMBODIMENTS

Figure 1:
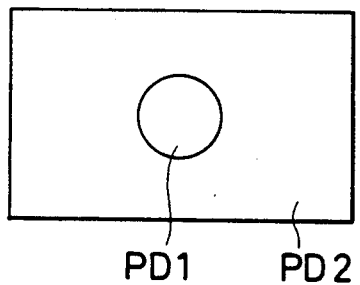
FIG. 1 is a diagram showing the arrangement of the light measuring elements which measure the brightness of the photographic view field.

FIG. 1 shows the arrangement of light measuring elements which measure the brightness of the photographic view field. The elements include a first light measuring element PD1 for measuring the brightness BVC in the central section of the view field and a second light measuring element PD2 for measuring the averaged brightness BVO of the overall view field excluding the central section. These light measuring elements PD1 and PD2 are disposed at a position suitable for measuring the brightness of the view field on the focusing screen of the camera, e.g., they are fabricated in the optical system of the finder. The structure is known in the art, and its explanation is omitted.

Figure 2:
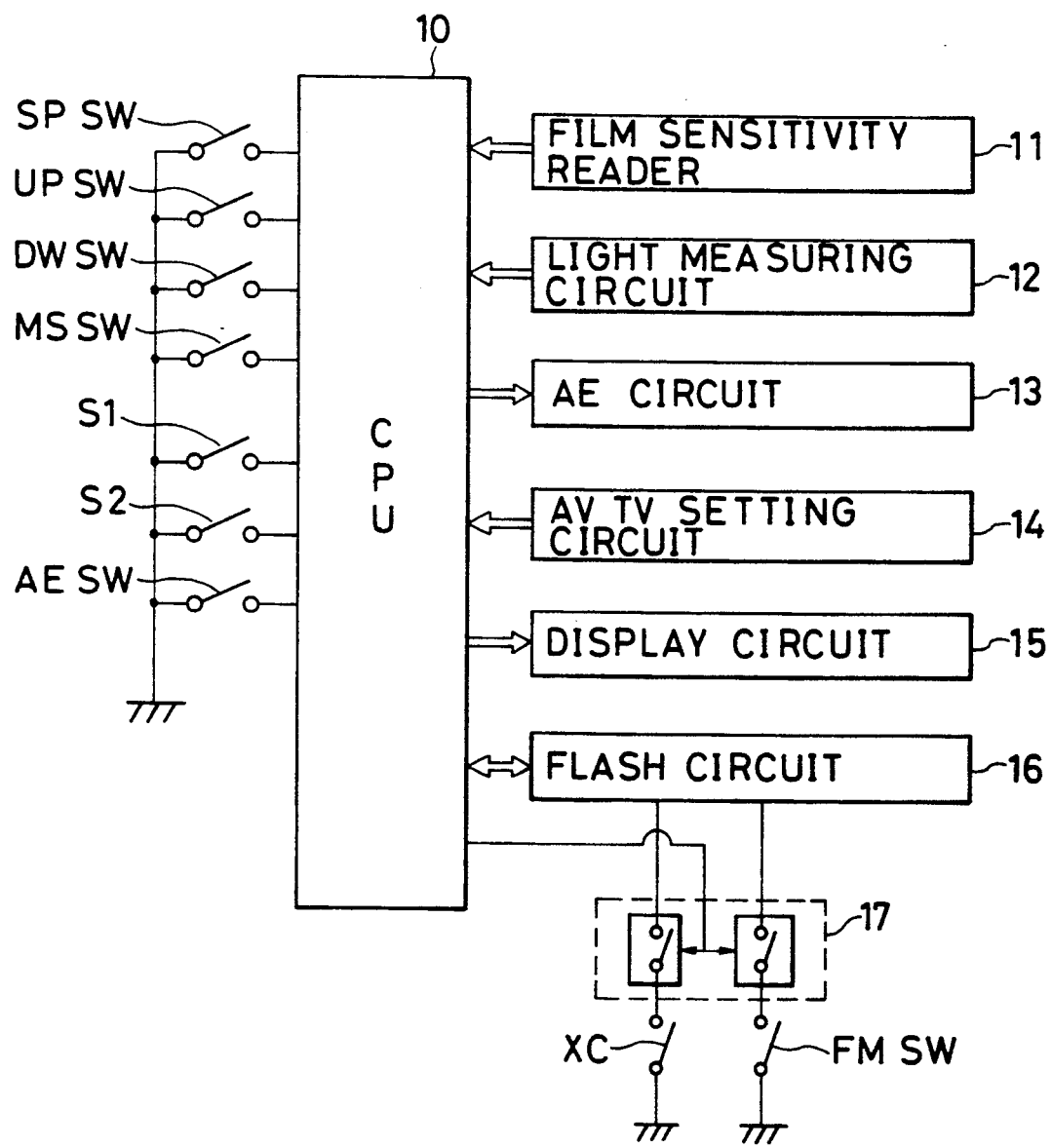
FIG. 2 is a block diagram of the exposure control circuit.

FIG. 2 shows an embodiment of the exposure control circuit based on the present invention. In the figure, indicated by numeral 10 is a control CPU, and numeral 11 is a film sensitivity reader which reads the DX code indicative of the film sensitivity printed on the exterior of the film case and enters the data to the control CPU 10. Numeral 12 is a light measuring circuit which enters the outputs of the light measuring elements PD1 and PD2 to the control CPU 10. Numeral 13 is an AE circuit which establishes the aperture stop based on the exposure control value determined by the control CPU 10 and operates the shutter. Numeral 14 is an AV-TV setting circuit which provides the control CPU 10 with the manually-set aperture stop value AVC when the camera exposure control mode is the aperture stop priority mode (A mode), the manually-set shutter speed value TVC when it is the shutter speed priority mode (S mode), or the manually-set aperture stop value AVC and shutter speed value TVC when it is the manual mode (M mode). Numeral 15 is a display circuit which operates on the display elements to display the exposure control value and other control data determined by the control CPU 10. Numeral 16 is a flash circuit for an externally attached flash device, and it incorporates a flash inhibit circuit 17 in connection with a flash mode switch FMS and contacts XC of the shutter mechanism. When the control CPU 10 does not output the flash inhibit signal (normal state), a flash mode selected by the photographer on the flash mode switch FMSW, i.e., with flash mode switch FMSW being closed, the flash is used; with FMSW being open, the flash is not used, is delivered to the control CPU 10. The circuit responds to the closing of the contacts XC to send a flash activation signal to the control CPU 10. Receiving the signal, the control CPU 10 activates the flash, and it disactivates the flash when the reflected light from the object indicates a prescribed exposure value as detected by a light reception circuit (not shown). When the photographer has operated the switch MSSW to select the multi-spot light measuring mode, the CPU 10 issues a flash inhibit signal so as to disable the flash operation.

Next, switches provided for the system will be explained. A switch AESW is to select an exposure control mode, i.e., program mode (P mode), aperture stop priority mode (A mode), shutter speed priority mode (S mode), or manual mode (M mode). A switch S1 is to initiate the light measurement and exposure computation, and it is closed in response to the first-depth depression of the shutter release button. S2 is the shutter release switch, which is closed in response to the second-depth depression of the shutter release button.

SPSW is the spot light-measuring switch, and by being closed, with the portion of object to be measured being placed in the spot measuring area of the finder, the measured value BVC of the portion is stored in the memory of the control CPU 10. By measuring the light at multiple spots (within eight spots in this embodiment) of the object, multi-spot light values are obtained. UPSW and DWSW are program shift keys, which are effective when the program mode (P mode) is selected as an exposure control mode, for altering the exposure control value determined for the brightness of the object on the program line diagram, i.e., the combination of the aperture stop value and shutter speed, while retaining the exposure value. MSSW is the multi-spot mode (multi-spot light measuring mode) selection switch, and it selects the multi-spot light measuring mode by being closed, or the open switch selects the averaged light measuring mode. Signals produced by these switches are fed to the control CPU 10. In the multi-spot light measuring mode, the CPU 10 issues the flash inhibit signal to the flash circuit 16.

Next, the control operation of the control circuit shown in FIG. 2 will be explained on the flowcharts of FIG. 3 through FIG. 5.

Figure 3:
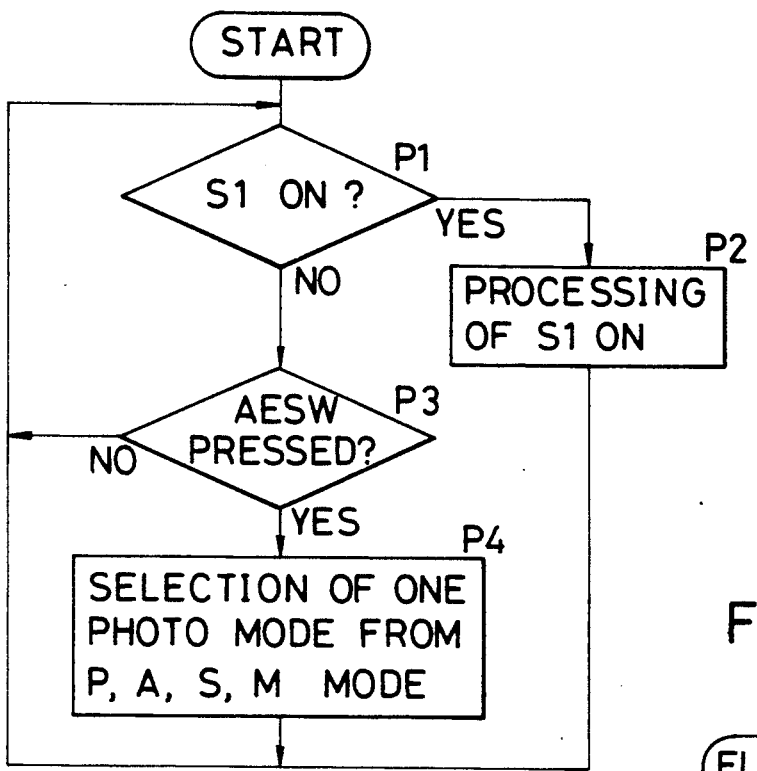
FIG. 3 is a flowchart showing in brief the exposure control process.
Figure 4:
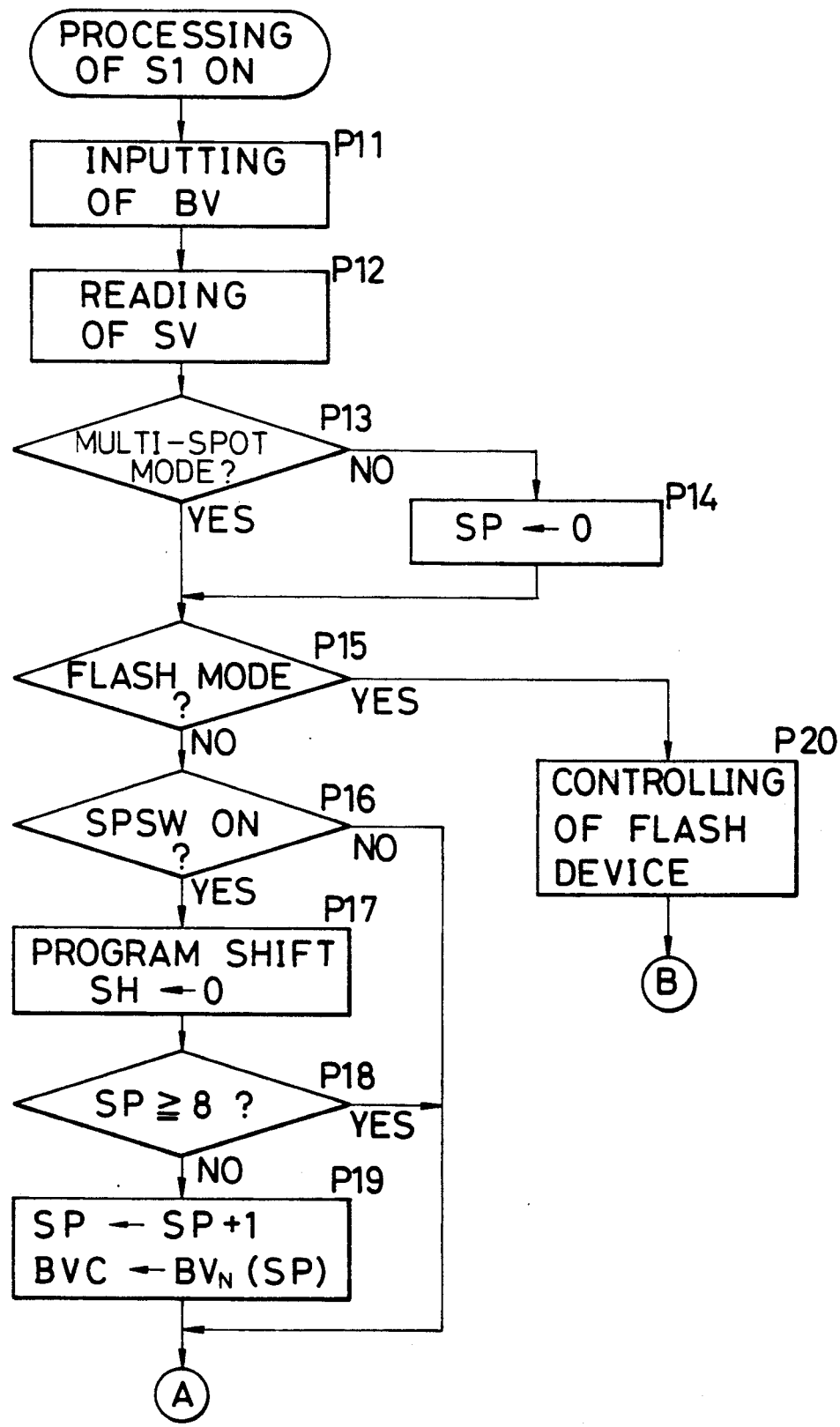
Figure 4:
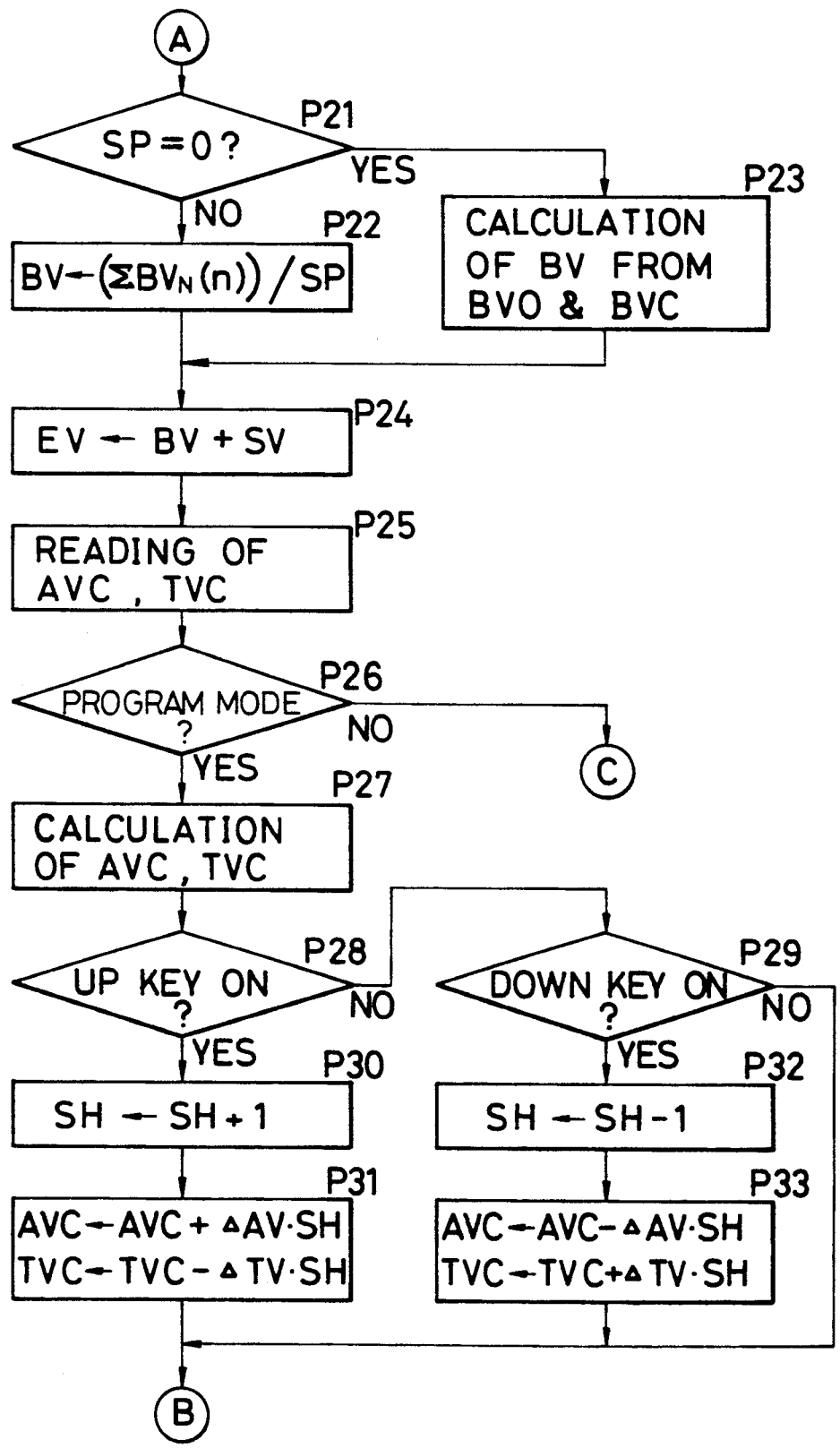

FIG. 3 is a flowchart showing in brief the exposure control process. Initially, after the control operation has started, it is tested whether or not the light measuring switch S1 is closed (step P1). If the switch is closed, the process shown in detail in FIG. 4 is implemented (step P2), or if it is open, the control sequence proceeds to step P3, which checks whether or not the exposure control selection switch AESW has been pressed, and in response to the depression, a selected mode (any of P mode, A mode, S mode and M mode) is set (step P4).

FIG. 4(a) to FIG. 4(c) are flowcharts showing the exposure control process which is carried out in response to the closure of the light measuring switch S1 as detected in step P2 in FIG. 3. Initially, the measured values BV provided by the light measuring circuit 12 are inputted (step P11). The values are the output of the spot light-measuring element PD1 and the output of the outer light measuring element PD2. Subsequently, the film sensitivity signal SV read by the film sensitivity reader 11 is entered (step P12). It is checked whether the multi-spot mode switch MSSW has been pressed to select the multi-spot measuring mode (step P13). If the mode is not selected, the measurement spot count memory is cleared to zero, and the control sequence proceeds to step P15. If the step P13 has revealed the selection of the multi-spot measuring mode in step P13, the control sequence proceeds to step P15.

The step P15 determines whether or not the photographer has specified the flash mode with a signal from the switch FMSW. If the flash mode is selected, the flash control is implemented (step P20), or if it is not selected, it is determined whether or not the spot measuring switch SPSW is closed (step P16). If the SPSW switch is found closed, the program shift number SH which has been set in the program mode (P mode) is reset in order to re-set the exposure control value based on the measured value (step P17). It is determined whether or not eight spots (eight light measuring points are available in this embodiment) have been measured (step P18). If not all of eight spots have been measured, the measurement spot count memory is increased by one, and the spot measured value $BV_N$ is stored as a measured value BVC in the memory (step P19). The control sequence proceeds to step P21, which determines whether or not the contents SP of the measurement spot count memory is zero. The control sequence also proceeds to step P21 if the step P16 has revealed that the spot measuring switch SPSW is open or the step P18 has revealed that the spot count is eight, and the zero-test for the spot count memory is carried out.

In case the step P21 reveals that the contents SP of the measurement spot count memory is zero, indicative of a mode other than the multi-spot measurement, the brightness BV used for the exposure control is calculated from the measured value BVC of the central section and the measured value BVO of the peripheral section of the view field (step P23). If the contents is not zero, indicative of the multi-spot measurement, the measured values are averaged to produce the brightness BV to be used for the exposure control (step P22). The exposure value EV is calculated from the calculated brightness BV and the film sensitivity signal SV (step P24). In case the exposure control mode selection switch AESW selects an exposure control mode other than the program mode (i.e., A mode, S mode or M mode), the aperture stop value and/or shutter speed are set, and these set-up values AVC and TVC are read (step P25).

It is determined whether or not the program mode is selected (step P26). If the program mode is not selected, the control sequence proceeds to the process headed by step P35, or if it is selected, the aperture stop value AVC and shutter speed TVC corresponding to the exposure value EV which has been evaluated on the program line diagram in step P24 is calculated (step P27). Determination is conducted as to whether program shift up key UPSW or down key DNSW has been pressed (steps P28, P29). In response to the depression of the up key, the program shift process for increasing the program shift number memory SH by one, adding the modified value $\Delta AV$, which is made by each depression of the up key, to the aperture stop value AVC, and subtracting the modified value $\Delta TV$ from the shutter speed TVC is implemented (steps P30, P31), while in response to the depression of the down key, the program shift process for decreasing the program shift number memory SH by one, subtracting the modified value $\Delta AV$, which is made by each depression of the down key, from the aperture stop value AVC, and adding the modified value $\Delta TV$ to the shutter speed TVC is implemented (steps P32, P33). If any of the up key and down key has not been pressed, the control sequence proceeds to step P40 by skipping the above processes.

On the other hand, if the step P26 has revealed that the program mode has been unselected, the control sequence proceeds to the process headed by step P35 thereby to detect the selected mode (steps P35, P36). In the case of the shutter speed priority mode, a proper aperture stop value AVC is calculated from the shutter speed TVC and exposure value EV (step P37), or in the case of the aperture stop priority mode, a proper shutter speed TVC is calculated from the aperture stop value AVC and exposure value EV (step P38), or in the case of the manual mode, the aperture stop value AVC and shutter speed TVC are used intact for the exposure control.

The aperture stop value and shutter speed for the exposure control are displayed on the display panel (step P40), and the closure of the multi-spot light measuring switch MSSW is determined (step P41). The closed MSSW switch disables flash device with the flash inhibit signal (step P42), or the open MSSW switch clears the multi-spot measuring point count memory SP (step P43).

It is determined whether or not the shutter release switch S2 is closed by the depression of the shutter release button. If the switch is found open, the control sequence proceeds to the main routine, or if the switch is closed, the shutter release control and exposure control (AE control) are carried out to complete the photography (steps P45, P46), the film is wound for the exposed frame (step P47), and the control sequence returns to the main routine.

Figure 5:
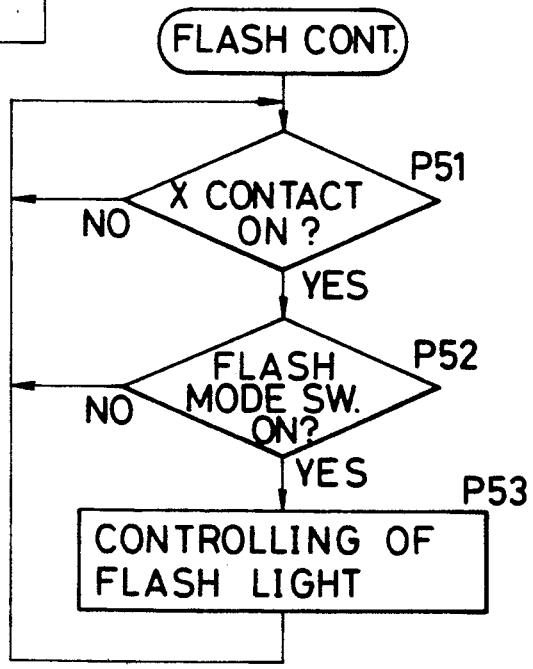
FIG. 5 is a flowchart showing the light control process for the external flash device.

FIG. 5 is a flowchart showing the flash control process for an external flashing device attached to the camera. Initially, after control has started, it is determined whether or not the X contacts for triggering the flash have been closed (step P51). When the flash mode switch is closed, the signal representing FMSW ON is sent to the CPU 10 through the flash circuit 16. If the X contacts are closed, the signal is checked whether to activate the flash device or not (steps P52 and P53).

According to the present invention, as described above, the multi-spot light measuring system equipped in a camera is operated to measure the brightness of arbitrary portions of the view field a plurality of number of times, and in case of conducting the exposure control based on the measured values, the operation of the flash device is disabled, thereby allowing the exposure control based on the result of multi-spot light measurement intended by the photographer.

In the foregoing first embodiment of this invention, the flash device can be controlled by application of either flashmatic control or light adjustment control, which will be explained later. These two flash device control schemes have distinct features, and their selective use depending on the object distance will accomplish more satisfactory exposure control.

The flashmatic control is a function which determines the aperture stop value depending on the distance to the object in compliance with the guide number indicative of the light output of the flash lamp and the film sensitivity. For an automatic focusing camera, a proper aperture stop is set automatically depending on the measured object distance. However, this method creates error in the exposure value due to error in the measured object distance, particularly in the case of a long distance object.

The light adjustment control is a function which allows the photographer to set an arbitrary aperture stop value, and operates to disactivate the flash lamp when the integrated value of the reflected light from the object derived from the flash light has reached a proper light level. This method allows free setting of aperture stop and is free from the influence of error in the measured distance to the object. However, the amount of light, i.e., exposure value, is effected by reflectivity of the object and background.

Accordingly, it is desirable to adopt by switching the flashmatic control for a short distance object or the light adjustment control for a long distance object.

The following describes the second embodiment of this invention which is intended to switch the flash control mode as mentioned above. It is assumed that the flash light photography mode is already selected for the camera, and only pertinent affair will be explained.

Figure 6:
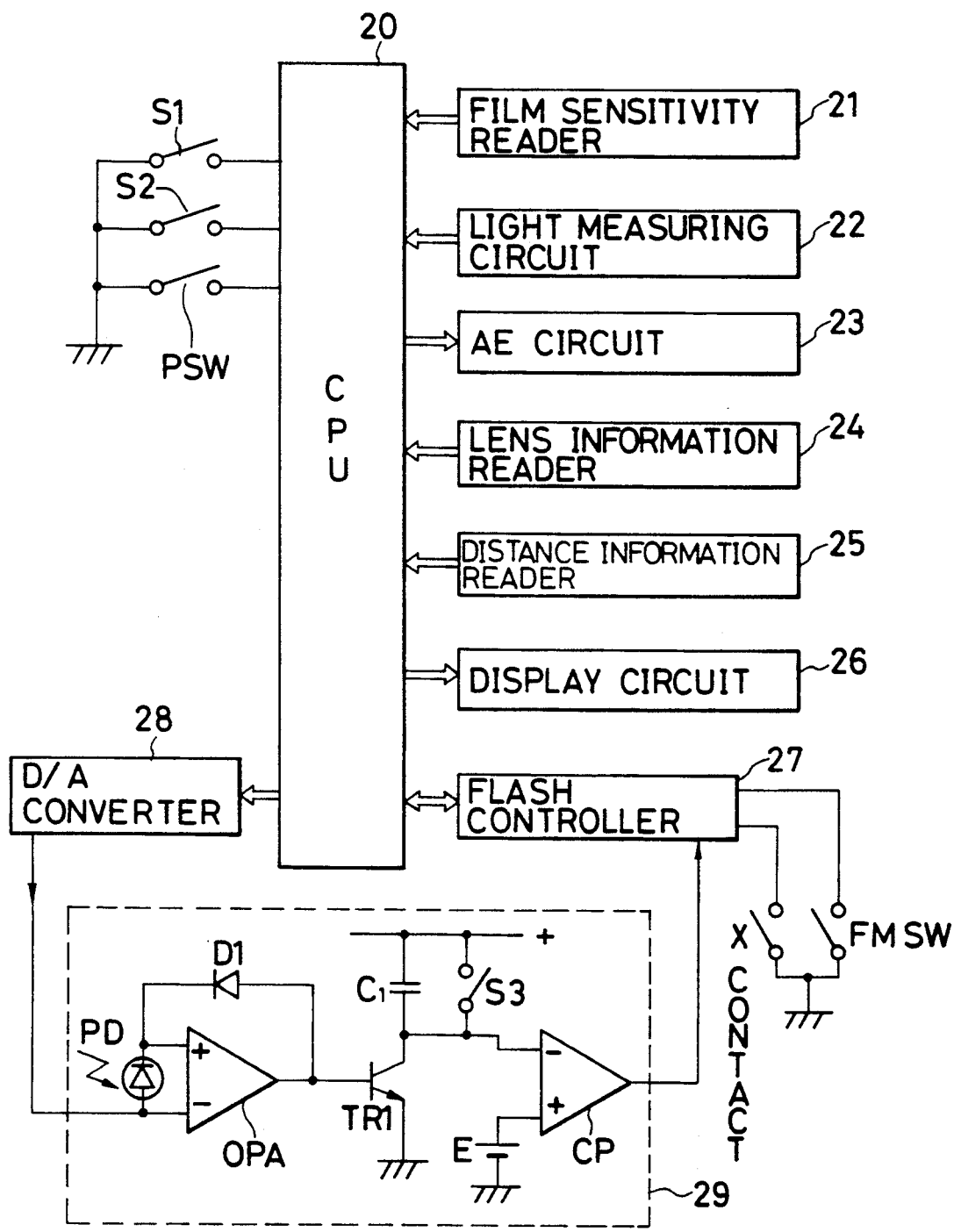
FIG. 6 is a block diagram of the flash light control circuit.

FIG. 6 shows an example of the flash control circuit. In the figure, indicated by numeral 20 is a control CPU, numeral 21 is a film sensitivity reader which reads the DX code indicative of the film sensitivity printed on the exterior of the film case and delivers the data to the control CPU 20. Numeral 22 is a light measuring circuit including an optoelectric element which measures the brightness of the photographic view field, and it delivers the output to the control CPU 10. Numeral 23 is an AE circuit which establishes the aperture stop based on the exposure control value determined by the control CPU 20, and operates the shutter. Numeral 24 is a lens information reader which reads the focal distance f, open aperture stop AVo and other lens information stored in a ROM provided in the photographic lens (not shown), and delivers the data to the control CPU 20. Numeral 25 is an object distance information reader which reads and counts the number of pulses indicative of the amount of movement of the lens from its reference position when it is brought to the in-focus position by the automatic focusing mechanism (AF), and delivers the count data as the object distance information D to the control CPU 20.

Indicated by numeral 26 is a display circuit which displays the exposure control values and other data determined by the control CPU 20 on the display elements. Numeral 27 is a flash controller which delivers the guide number IV to the control CPU 20, and it is connected with the flash mode switch FMSW, which is turned ON by the photographer to select the flash mode to send the same signal representing FMSW ON as described in the first embodiment. The flash controller 27 has a connection with the X contacts of the camera, and it activates the flash device in response to the closure of the X contacts through the operation of the shutter release. The controller 27 also receives a flash termination signal provided by a light adjustment circuit 29, which will be explained shortly, thereby to disactivate the flash lamp.

Among switches used, S1 is a switch which is closed in response to a first-depth depression of the shutter release button to initiate the light measurement and calculation of exposure. S2 is a shutter release switch which is closed in response to a second-depth depression of the shutter release button. PSW is a flash light control switch (party mode switch) which is operated by the photographer to select the flashmatic control or light adjustment control. The PSW switch in a closed state delivers a signal indicative of the flashmatic control or in an open state delivers a signal indicative of the light adjustment control to the control CPU 20. Flash light photography based on the flashmatic control is not effected by the reflectivity of the object, as opposed to the light adjustment control, and because of this feature suitable to shoot a scene of party, the PSW switch may be called "party mode switch".

Indicated by 28 is an A/D converter which converts light adjustment modification signal SVO produced by the control CPU 20 for use in the light adjustment control of the flash device into an analog signal, and 29 is a light adjusting circuit which implements the light adjustment control for the flash device.

Next, the light adjustment circuit 29 will be explained.

PD is a light-sensitive element disposed at the position where the flash light coming through the photographic lens and aperture stop and reflecting on the film surface is received. The output of the PD is fed to the operational amplifier OPA by being added to the light adjustment modification signal SVO provided by the D/A converter 28, and the input is rendered the logarithmic compression by means of a diode D1. The output signal of the amplifier is fed to the base of a transistor TR1, which then produces a collector current based on the logarithmic expansion. A switch S3, which opens when the movement of the leading blind of the shutter mechanism has completed, is connected in parallel to a capacitor C1. Opening of the switch S3 causes the transistor TR1 to charge the capacitor C1, and the capacitor terminal voltage rises progressively by integration. A comparator CP having its input terminal connected to the terminal of the capacitor C1 compares the capacitor voltage with the reference voltage E, and it produces a signal on its output terminal when the integrated voltage has reached the threshold. The output signal is delivered to the flash controller 17, which then disactivates the flash device.

Figure 7:
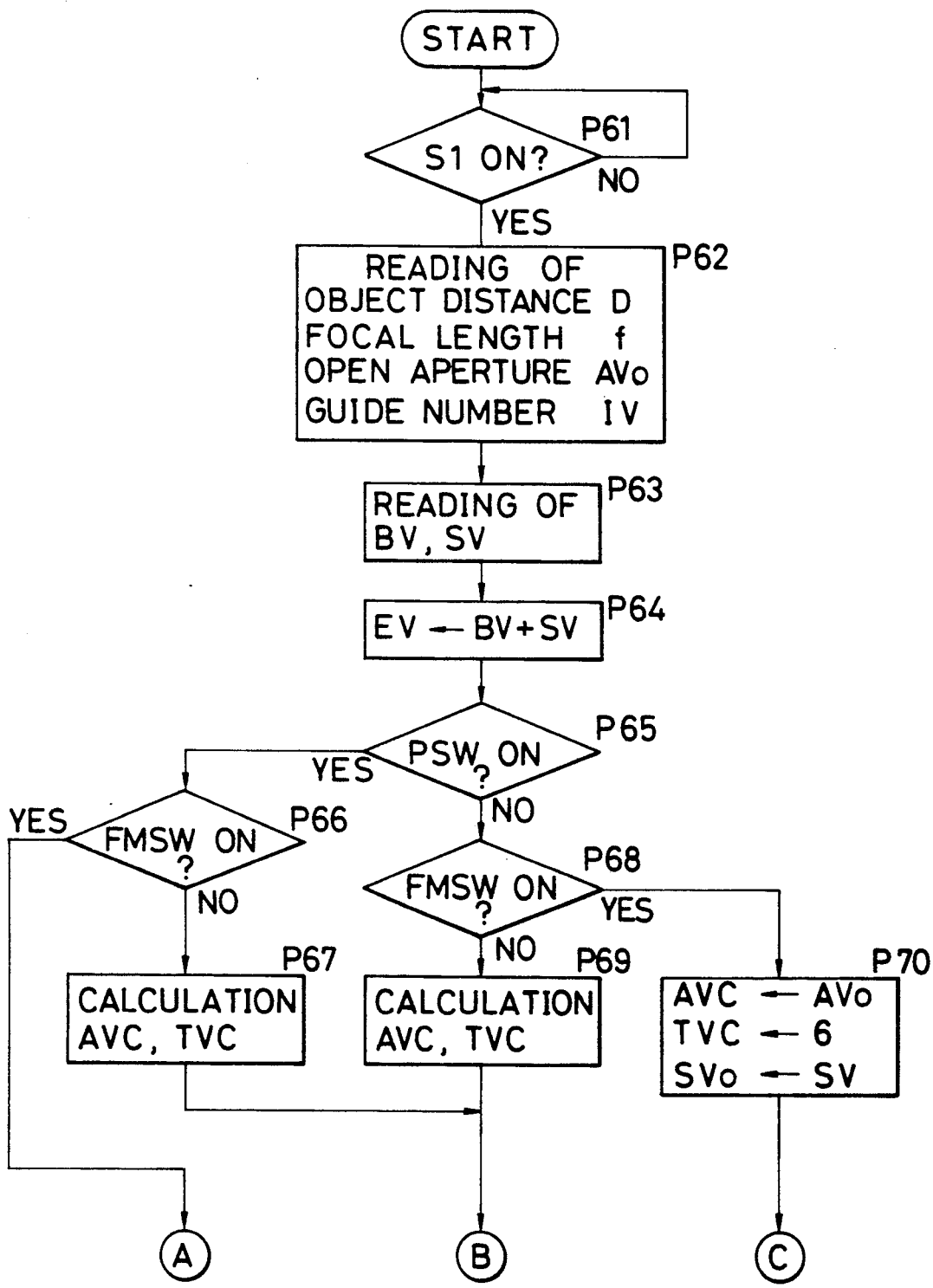
FIGS. 7(a) and 7(b) are diagrams explaining the control operation of the flash light control circuit.
Figure 7:
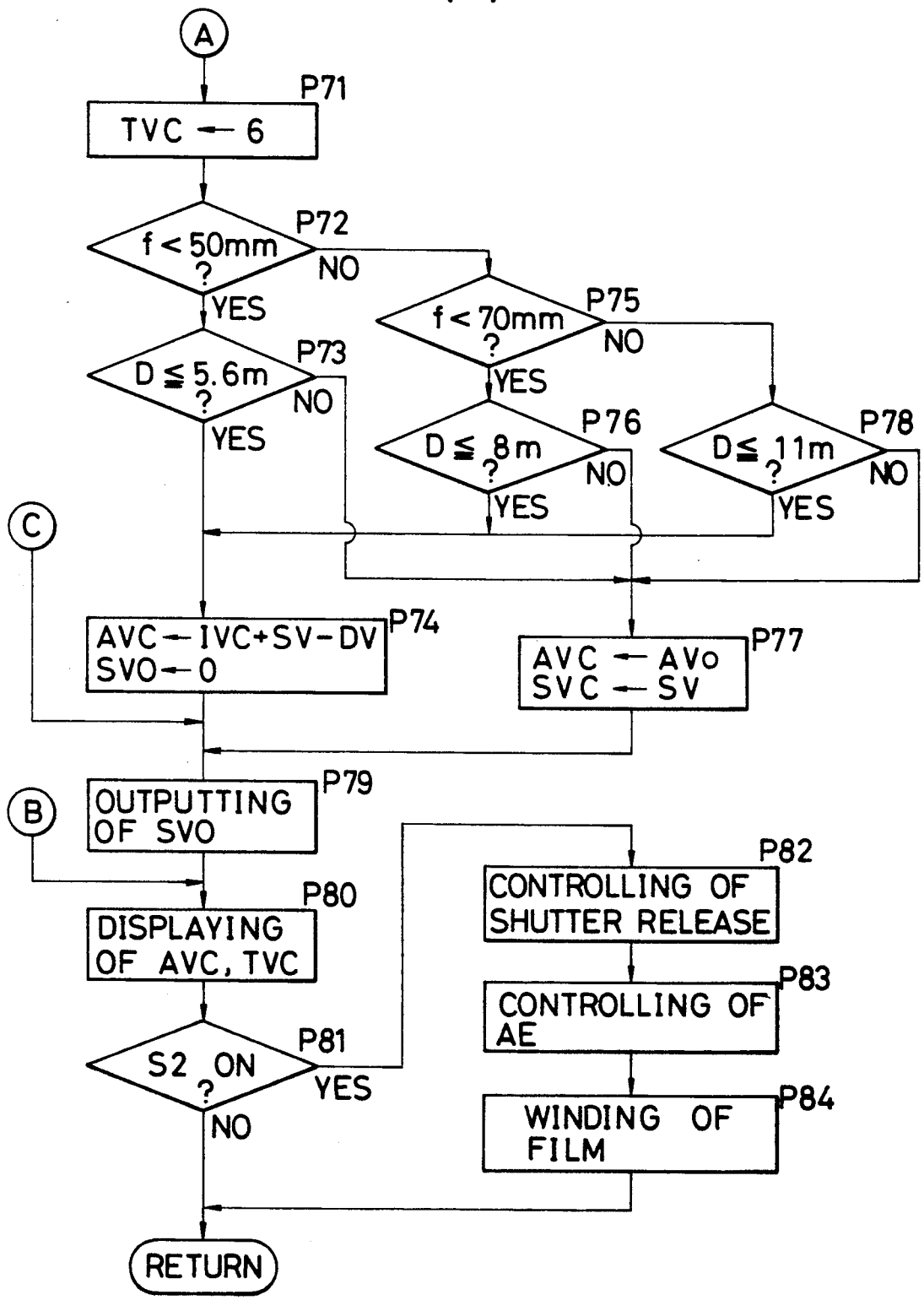

Next, control operation carried out by the control CPU 20 in the control circuit shown in FIG. 6 will be explained on the flowcharts of FIGS. 7(a) and 7(b).

Initially, after the control operation has started, it is determined whether or not the light measuring switches S1 is closed (step P61). If the switch is found closed, the object distance D, focal length f of the photographic lens, open aperture stop value AVo, and guide number IV of the flash device are read (step P62). The measured value BV indicative of the brightness of the object and the film sensitivity information SV are read (step P63), and from these data the exposure value EV is calculated as $EV = BV + SV$ (step P64). Selection of flashmatic control or light adjustment control by the photographer is identified from the state of the flash light control switch (party mode switch) PSW (step P65). If the switch PSW is found closed, lighting based on the flashmatic control is implemented. Namely, it is determined as to whether or not the photographer has chosen the flash mode with reference to the state of the flash mode switch FMSW (step P66), and in the case of the closed FMSW switch, i.e., flash mode, the shutter speed TVC, among the exposure control values to be set on the camera, is set to "6" which is a speed tuned to flashing and fast enough to avoid the risk of camera shake (step P71).

Subsequently, it is determined whether or not the focal length f of the photographic lens is shorter than or equal to 50 mm, and if this condition is met, it is further determined whether or not the object distance D is shorter than or equal to 5.6 m (steps P72, P73). In case the distance D is shorter than or equal to 5.6 m, the control sequence proceeds to step P74, in which the aperture stop value AVC is calculated as AVC=IV+SV−DV and the flash light adjustment value SVO is set to zero for the flashmatic control. The variable IV is the apex value of the guide number indicative of the light output of the flash device and DV is the object distance in terms of the apex value. In case the object distance D is farther than 5.6 m, the control sequence proceeds to step P77, in which the aperture stop value AVC is set to AVo and the flash light modification value SVO is set to SV for the flash light adjustment control. AVo is the open aperture stop of the photographic lens, and SV is the film sensitivity.

If step P72 has revealed that focal length f is longer than 50 mm, the control sequence proceeds to step P75, which determines whether or not focal length f is shorter than or equal to 70 mm, and in case focal length f is shorter than 70 mm, it is determined whether or not the object distance D is shorter than or equal to 8 m (steps P75, P76). If D is shorter than or equal to 8 m, the control sequence proceeds to step P74, otherwise the sequence proceeds to step P77. If step P75 has revealed that focal length f is longer than 70 mm, it is determined whether or not the object distance D is shorter than or equal to 11 m (step P78). If D is shorter than or equal to 11 m, the control sequence proceeds to step P74, otherwise the sequence proceeds to step P77.

The flash light control modification value SVO established as described above is delivered to the light adjustment circuit 29 by way of the D/A converter 18 (step P79), and the aperture stop value AVC and shutter speed TVC are sent to the display circuit 16 for display (step P80).

If step P66 has revealed that the flash mode switch FMSW is open, indicating that flash light photography is disabled, the aperture stop value AVC and shutter speed TVC are calculated (step P67), and the control sequence proceeds to the process headed by step P80.

If step P65 has revealed that the flash light control switch PSW is open (not party mode), the control sequence proceeds to step P68, in which it is determined whether or not the flash mode switch FMSW is closed. If the switch is open, indicating that flash light photography is disabled, the aperture stop value AVC and shutter speed TVC are calculated from the exposure value EV (step P69), and the control sequence proceeds the process headed by step P80. If step P68 has revealed that the flash mode switch FMSW is closed, indicating the light adjustment control, the aperture step AVC is set to AVo (open aperture stop) and the shutter speed TVC is set to "6" ( it is tuned to flashing and appropriate to avoid the risk of camera shake) and the flash light modification value SVO is set to SV (step P70), and the control sequence proceeds to the process headed by step P79.

The preparation of photography is now completed, and the system waits for the closure of the shutter release switch S2 (step P81). In response to the closure of S2, the shutter release control and exposure control are carried out based on the aperture stop value and shutter speed which have been set as described above (steps P82, P83). On completion of photography, the film is wound for one frame (step P84), and the system operation terminates.

Figure 8:
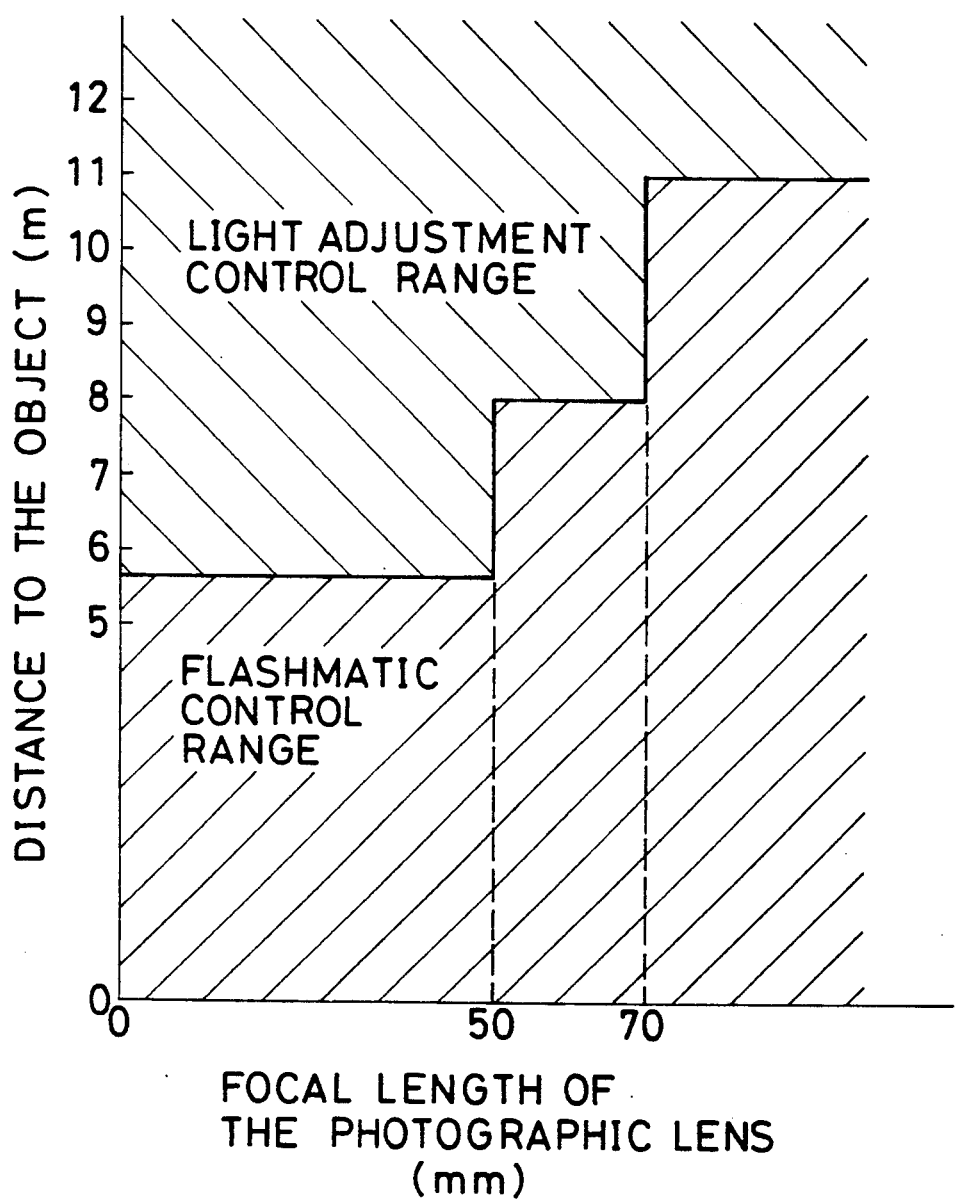
FIG. 8 is a diagram explaining the domains in which flashmatic control and light adjustment control are implemented.

FIG. 8 is a diagram showing the flashmatic control range and light adjustment control range which are set in the foregoing steps P72 through P79 depending on the focal length of the photographic lens and the distance to the object.

Through the foregoing processes, the range of flash light photography based on the flashmatic control, which is not affected by the reflectivity of the object, is altered depending on the focal length of the photographic lens, thereby minimizing the excess of lack of exposure caused by error in distance measurement. Consequently, the range of flash light photography based on the flashmatic control can be expanded in proportion to the focal length of the photographic lens.

Because the flash device of the second embodiment cannot receive the flash inhibit signal as described in the first embodiment, when the flash device is attached to the camera body as described in the first embodiment, the multi-spot measuring mode is inhibited with the signal representing FMSW ON.

What is claimed is:

1. A camera system comprising:
    means for measuring light value of an object to be photographed;
    means for controlling the measuring means in order to measure the light value repeatedly to provide a plurality of light values;
    means for determining an exposure value according to the plurality of the light values;
    means for illuminating the object; and
    means for inhibiting operation of the illuminating means when the controlling means makes the measuring means measure the light value repeatedly.

2. A camera system as claimed in claim 1, wherein the measuring means measures the light value on a spot measuring area which is a relative narrow area in a photographing area.

3. A camera system having two photographing modes, comprising:
    means for photographing in either of the two photographing modes;
    means for measuring a light value of an object to be photographed
    means for controlling the measuring means in order to measure the light value repeatedly to provide a plurality of light values;
    means for determining an exposure value according to the plurality of the light values; and
    means for changing over from one of the modes to another when the controlling means makes the measuring means measure the light value repeatedly.

4. A camera system as claimed in claim 3, wherein the two photographing modes include a first mode for photographing with a flash light and a second mode for photographing without the flash light, and the changing means changes over from the first mode to the second mode when the controlling means makes the measuring means measure the light value repeatedly.

5. A camera system comprising:
    means for measuring light value of an object to be photographed;
    means for judging whether or not a spot measuring mode, in which the measuring means measures the light value on a spot measuring area which is a relatively narrow area in a photographic area, is selected;
    means for illuminating the object; and
    means for inhibiting operation of the illuminating means when the judging means judges the spot measuring mode is selected.

6. A camera system as claimed in claim 5, further comprising:
   means for controlling the measuring means in order to measure the light value repeatedly to provide a plurality of light values when the spot measuring mode is selected; and
   means for determining an exposure value according to the plurality of the light values.

7. A camera system comprising:
   means for measuring light value of an object to be photographed;
   means for judging whether or not a multi-measuring mode, in which the measuring means measures the light value repeatedly, is selected;
   means for illuminating the object; and
   means for inhibiting operation of the illuminating means when the judging means judges the multi-measuring mode is selected.

8. A camera system having two photographing modes, comprising:
   means for measuring light value of an object to be photographed;
   means for judging whether or not a multi-measuring function, in which the measuring means measures the light value repeatedly, is selected; and
   means for changing over the photographing mode from one of the modes to another mode when the judging means judges the multi-measuring function is selected.

9. A camera system as claimed in claim 8, wherein two photographing modes including a first mode for photographing with a flash light and a second mode for photographing without the flash light, and the changing means changes over from the first mode to the second mode when the controlling means makes the measuring means measure the light value repeatedly.

* * * * *